Feb. 14, 1933.   L. N. STEHR   1,897,648
PISTON RING
Filed April 5, 1932

Inventor
Leo N. Stehr

By Clarence A. O'Brien
Attorney

Patented Feb. 14, 1933

1,897,648

UNITED STATES PATENT OFFICE

LEO N. STEHR, OF SAN DIEGO, CALIFORNIA, ASSIGNOR TO STEHR PISTON RING COMPANY, OF SAN DIEGO, CALIFORNIA, A PARTNERSHIP COMPOSED OF FRED W. STEHR AND LEO N. STEHR

PISTON RING

Application filed April 5, 1932. Serial No. 603,319.

This invention relates to a piston ring, the general object of the invention being to make the ring of a plurality of small rings placed one upon another, and to crimp each small ring to provide alternating depressed and raised portions, with the amount of crimp greater at the inner portion of the small ring, than that portion adjacent the outer edge of the ring or that edge which engages the cylinder wall.

This piston ring formed of a plurality of small crimped rings will provide perfect lubrication to the cylinder walls and will prevent oil pumping, thus saving loss of oil and will increase compression materially. Also the small rings can be placed relatively to each other so that their split or separated ends will be out of alinement so as to prevent passage of oil thru the split portions when the small rings are assembled to form a piston ring.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1:
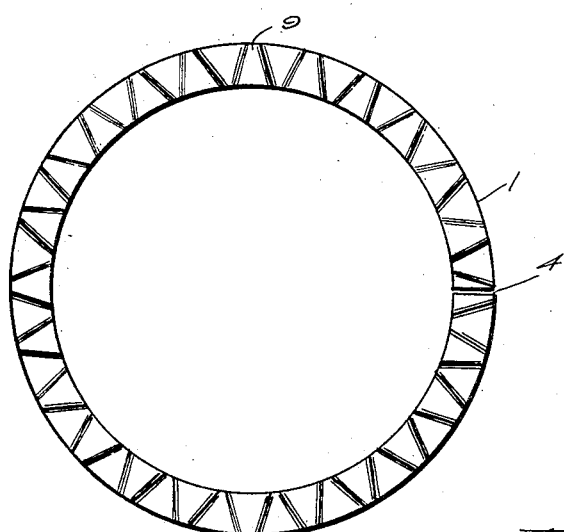
Figure 1 is a plan view of one of the small rings.
Figure 5:
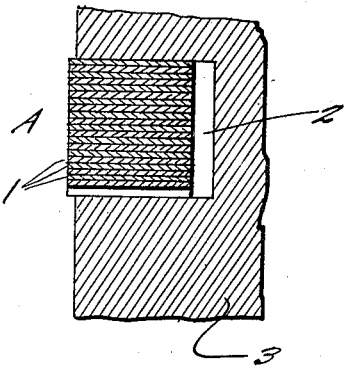
Fig. 5 is a sectional view showing the improved piston ring in a groove of a piston.
Figure 2:
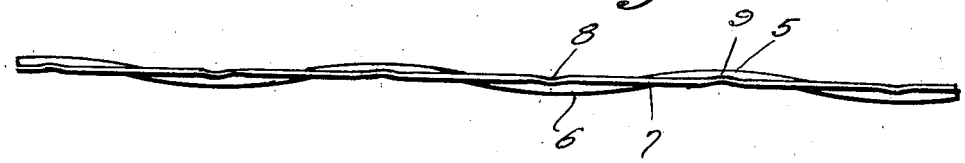
Fig. 2 is an enlarged fragmentary view looking toward the outer edge of a small ring.
Figure 3:
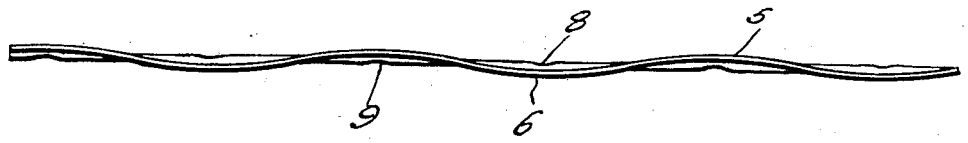
Fig. 3 is a similar view looking toward the inner edge of a small ring.
Figure 4:
Fig. 4 is a transverse sectional view through a part of one of the small rings.

As shown in Fig. 5, the piston ring A is composed of a plurality of superimposed small rings 1 the piston ring of course being placed in a groove 2 in a piston 3.

As shown in the other figures, the small ring 1 is of split construction with its ends slightly spaced apart as shown at 4, and said ring is crimped with the amount of crimp greater adjacent the inner edge of the ring than adjacent the outer edge thereof. This crimping of the small ring forms alternating raised portions 5 and depressed portions 6, with the inner portion of the ring of wavy formation, and the outer edge of the ring is substantially straight as shown at 7, with alternating small depressions 8, and small raised portions 9 which are spaced apart by the substantially straight part 7.

The raised portions 9 and depressions 8 are of considerable less width and depth than the depressions and raised portions formed by the wavy section at the inner part of the ring.

This crimp construction of the small rings causes land pressure, that is, pressure exerted on the sides of the groove 2. This pressure causes the ring segments to fit the groove snugly and evenly and also causes the ring to expand and evenly fit the entire surface of the cylinder wall.

This improved ring creates a reservoir for oil and the outer circumference of the ring will contact the cylinder walls evenly and perfectly and wear of the individual rings will be automatically taken up and this improved ring will fit tapered grooves, and will work with cylinders that are not perfectly round, and will also work in oversize grooves.

Each small ring will provide a wiping edge against the cylinder wall and if one of the rings should fail to properly contact the cylinder wall, no harm will result as one or more of the other small rings will come in contact with the wall and thus prevent leakage of oil and leaking of compression.

In some cases it might be desirable to place uncrimped rings in the piston ring assembly with an uncrimped ring and a crimped ring placed side by side in the groove and alternated throughout the groove installation.

Of course the rings can be made in different sizes to suit different sizes of pistons and the crimping of the rings may be varied to suit conditions under which they are used.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:—

1. A piston ring of the class described formed of a plurality of small rings placed one upon another, each small ring being crimped with a greater amount of crimp adjacent its inner edge than at its adjacent outer edge.

2. A piston ring of the class described formed of a plurality of small rings placed one upon another, each small ring being crimped with a greater amount of crimp adjacent its inner edge than at its adjacent outer edge, the small ring being of split construction with the gaps of the small rings out of alinement.

3. A piston ring of the class described composed of a plurality of superimposed small rings, each small ring being crimped to provide alternating raised and depressed portions with said portions being of greater width and depth at the inner part of the ring than at the outer part.

In testimony whereof I affix my signature.

LEO N. STEHR.